(12) United States Patent
Burkhalter et al.

(10) Patent No.: US 12,162,454 B2
(45) Date of Patent: Dec. 10, 2024

(54) AIRCRAFT BRAKE WEAR OPTIMIZATION

(71) Applicant: Meggitt Aircraft Braking Systems Corporation, Akron, OH (US)

(72) Inventors: Kurt Burkhalter, Akron, OH (US); James L. Hill, Massillon, OH (US); James M. Malone, Jr., Cuyahoga Falls, OH (US); Kenneth D. Everhard, Wadsworth, OH (US)

(73) Assignee: Meggitt Aircraft Braking Systems Corporation, Akron, OH (US)

( * ) Notice: Subject to any disclaimer, the term of this patent is extended or adjusted under 35 U.S.C. 154(b) by 239 days.

(21) Appl. No.: 17/799,387

(22) PCT Filed: Feb. 12, 2021

(86) PCT No.: PCT/US2021/017761
§ 371 (c)(1),
(2) Date: Aug. 12, 2022

(87) PCT Pub. No.: WO2021/163409
PCT Pub. Date: Aug. 19, 2021

(65) Prior Publication Data
US 2023/0076895 A1 Mar. 9, 2023

Related U.S. Application Data

(60) Provisional application No. 62/975,824, filed on Feb. 13, 2020.

(51) Int. Cl.
*B60T 17/22* (2006.01)
*B60T 8/17* (2006.01)
(Continued)

(52) U.S. Cl.
CPC .......... *B60T 17/221* (2013.01); *B60T 8/1703* (2013.01); *B60T 8/885* (2013.01); *B64C 25/44* (2013.01); *B60T 2270/406* (2013.01)

(58) Field of Classification Search
CPC ...... B60T 17/221; B60T 8/1703; B60T 8/885; B60T 2270/406; B60T 17/22; B64C 25/44
See application file for complete search history.

(56) References Cited

U.S. PATENT DOCUMENTS

2007/0179686 A1 8/2007 Devlieg et al.
2007/0200427 A1 8/2007 Devlieg
(Continued)

FOREIGN PATENT DOCUMENTS

EP 3359433 8/2018

*Primary Examiner* — Brian P Sweeney
(74) *Attorney, Agent, or Firm* — Renner, Kenner, Greive, Bobak, Taylor & Weber

(57) ABSTRACT

A method for aircraft brake wear optimization includes processes by which the actual instantaneous temperature of brakes can be determined during taxi braking operations. The invention is particularly applicable to carbon disc brakes in aircraft. In the system, the energy absorbed by the carbon disc brakes during taxiing operation is calculated and a conversion made from energy absorbed to disc temperature is made. The system uses less than a full complement of brakes during taxiing such that the brakes actually employed during taxiing are at elevated temperatures, which are characterized by improved brake wear. The system provides substantially instantaneous thermal information, in contrast to the prior art relying upon thermal measurements rather than energy calculations.

12 Claims, 3 Drawing Sheets

(51) Int. Cl.
*B60T 8/88* (2006.01)
*B64C 25/44* (2006.01)

(56) References Cited

U.S. PATENT DOCUMENTS

| | | |
|---|---|---|
| 2009/0114488 A1* | 5/2009 | Bailey ................... B60T 13/74 |
| | | 188/1.11 E |
| 2009/0210126 A1 | 8/2009 | Dellac et al. |
| 2010/0286881 A1 | 11/2010 | Cahill et al. |
| 2018/0079402 A1* | 3/2018 | Brüggemann ........ B64C 25/426 |
| 2019/0077500 A1 | 3/2019 | Kipp |
| 2019/0291708 A1 | 9/2019 | Bruggemann et al. |

\* cited by examiner

AIRCRAFT BRAKE WEAR OPTIMIZATION

CROSS-REFERENCE TO RELATED APPLICATION

This application claims priority to U.S. Provisional Patent Application No. 62/975,824, filed Feb. 13, 2020, entitled "Aircraft Brake Wear Optimization."

TECHNICAL FIELD

The invention herein resides generally in the art of vehicle braking systems and more particularly to braking systems for aircraft. The invention further relates to an aircraft braking system employing carbon brake discs and which optimizes carbon brake disc wear. Specifically, the invention relates to an aircraft braking system that determines brake operating temperatures during taxiing and selectively employs sets of brakes having a current operating temperature determined from aircraft operating parameters to be characteristic of optimal brake wear performance.

BACKGROUND OF THE INVENTION

Carbon disc brakes are commonly used in aircraft applications to facilitate control of the aircraft during taxiing before take-off and after landing. Because heat stacks made of carbon discs are lightweight and quite effective in providing the desired braking functions, they are very attractive for use in the aircraft industry. However, carbon discs are quite expensive and, accordingly, their wear rate must be managed to ensure cost effectiveness without reducing braking efficiency.

It has been found that the wear on carbon discs is somewhat independent of the amount of braking torque experienced. In effect, the carbon discs experience similar wear during taxiing as they do in the high-torque event immediately following landing. It has been known in the past to selectively employ only certain brakes during taxiing events and to alternate the brakes so employed in order to reduce the amount of wear experienced by the brake, without sacrificing braking and maneuverability. These efforts have sought to improve brake wear life by reducing the number of taxi/braking events to which each brake is subjected.

Current systems rely on wheel speed, pilot/co-pilot pedal position, and in some proposed implementations, actual brake temperatures from the brake temperature monitoring system (BTMS) of the aircraft. This information is used by the brake control system (BCS) to selectively enable/disable portions of the brakes in the system to reduce wear of the carbon discs. However, the BTMS data is often inconsistent across the aircraft, or has a significant lag, which can distort the true brake temperature and make determinations based on temperature potentially imprecise.

It is known that, while carbon brake wear is not heavily dependent on braking torque, it is heavily influenced by temperature. Indeed, dynamometer test results show that carbon brake wear is increased at lower temperatures. FIG. 1 is an example of dynamometer wear assessment for an aircraft and shows that the optimum BTMS reading (horizontal axis) to minimize brake disc wear is achieved by maximizing the BTMS readout to high levels while remaining suitable to allow the aircraft to take off—often in the range of 200-250° C. However, temperatures this high are generally difficult for an operator to practically achieve.

The graph of FIG. 1 further illustrates the potential to improve brake life for the subject aircraft, particularly at the coldest BTMS temperature, shown at 00 in the graph of the BTMS readout departing the gate. At a temperature readout greater than 06 aircraft takeoff is not permitted because the brake temperature is at such a level that the brakes could not withstand a rejected takeoff (RTO) of maximum possible energy. At readouts of 06 or less, takeoff is permitted.

Curve 10 of FIG. 1 shows the typical correlation between BTMS readout departing the gate and the relative wear life of the carbon discs in a standard system, while it is most desired that the curve be that indicated by the numeral 12, which, at the very least, demonstrates significant benefit for cold taxi operations and consistently higher wear life expectations in the upper allowable temperature range.

SUMMARY OF THE INVENTION

In light of the foregoing, it is a first aspect of the invention to provide a method for aircraft brake wear optimization by which taxiing operations are performed with less than the full complement of brakes on the aircraft, with those brakes operating at an elevated temperature characteristic of low wear rates.

Another aspect of the invention is the provision of a method for aircraft brake wear optimization that actually focuses on energy dissipated by the brakes during taxiing, rather than relying on temperature read-outs from the aircraft brake temperature monitoring system.

A further aspect of the invention is the provision of a method for aircraft brake wear optimization that inhibits and enables selective groupings of brakes for taxiing operations in an effort to obtain a uniform wear of those brakes.

Yet a further aspect of the invention is to provide a method for aircraft brake wear optimization in which brakes can operate at elevated temperatures during taxiing, but with such operation within a range capable of accommodating a rejected takeoff.

The foregoing and other aspects of the invention that will become apparent as the detailed description proceeds are achieved by a method for optimizing aircraft carbon disc brake wear, comprising: calculating the actual energy absorbed by each carbon disc brake during taxiing operations; from the calculations of energy absorbed, determining a current carbon disc brake temperature; and selectively inhibiting and enabling actuation of said carbon disc brakes as a function of disc brake temperature.

BRIEF DESCRIPTION OF THE DRAWINGS

For a complete understanding of the various aspects, structures and processes of the invention, reference should be made to the following detailed description and accompanying drawings, wherein.

DETAILED DESCRIPTION OF ILLUSTRATIVE EMBODIMENTS

Figure 1:
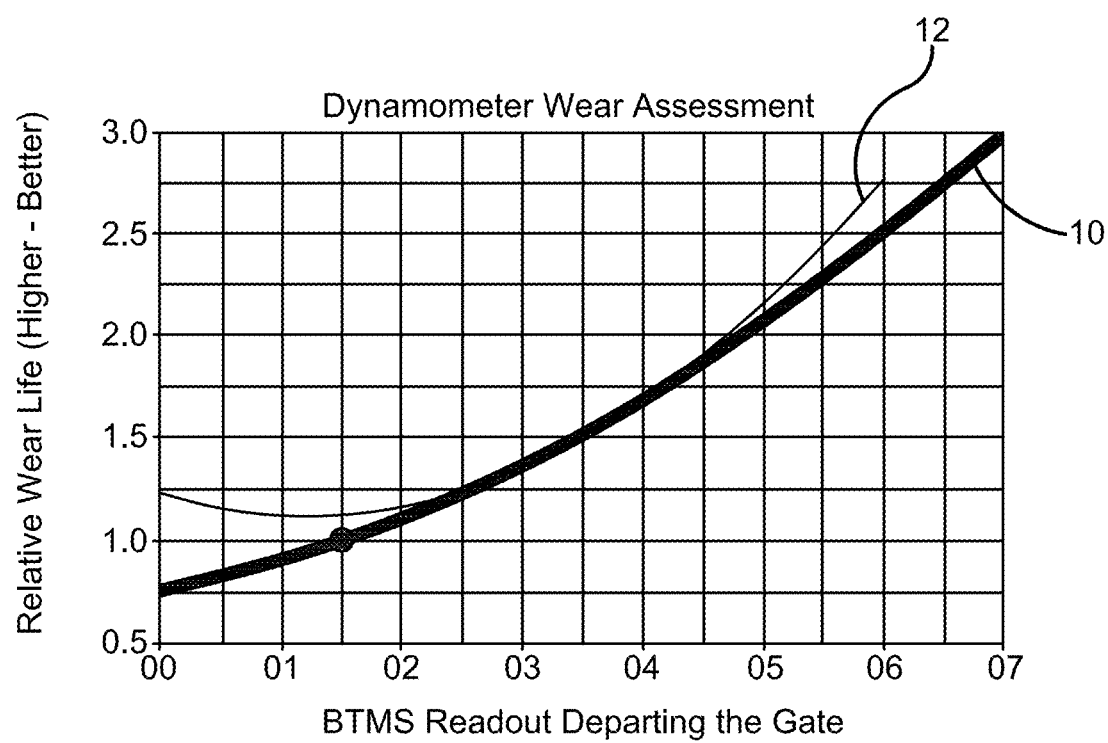
FIG. 1 is a graph comparing the brake wear characteristics of an aircraft with and without the improvements of the invention and as a function of the brake stack temperature read from a brake temperature monitoring system.

Because of the errors and delays attendant to the use of brake temperature readings from the BTMS of an aircraft, the invention herein replaces or adjusts those readings with a calculation of the approximate energy absorbed by each brake during taxiing operations. It does so by utilizing data such as brake torque, aircraft mass, and wheel speed signals. From the calculation of absorbed energy, a more suitable, accurate, and timely brake temperature can be determined. The temperature determined from brake energy calculations is then used as part of the switching decision as to the selection, timing and duration of the actuation of the various brakes in order to elevate the brake stack temperatures to a desired minimum temperature. The invention contemplates enhancement of the temperature calculation by using the brake stack mass available on various aircraft generating the electronic brake wear data.

Employment of the instant invention to its maximum benefit requires an assessment of each brake's energy and a determination of the associated brake temperature. Based on this information, as well as speed, pedal demand, and various other available braking/aircraft parameters, a determination can be made as to which brakes can be optimally deployed to provide maximum wear life potential. Such methods contemplate utilization of brakes selectively or preferentially over multiple flights, storing in memory past use history, and changing that use when conditions are suitable.

The invention further contemplates that the pilot may always have essentially instant overriding control over all of the brakes based on pedal or other inputs. Since changing the number of active brakes has a potential for changing the perceived braking responsiveness of the aircraft, such can be managed with appropriate pedal curves and other features.

The invention contemplates various bases for switching or selecting the groupings of brakes to be activated during taxiing to achieve the benefits of improved carbon disc wear. According to one embodiment of the invention, the grouping of brakes will be switched or changed on each flight leg. In such an embodiment, the switching can be indexed at any appropriate time such as when the aircraft lifts off of the runway at the beginning of a flight or sets down on the runway at the end of a flight, both of which can be accommodated by a weight on wheels (WOW) or other similar sensor.

According to another embodiment of the invention, the grouping of brakes for activation and use can be switched based on time periods, such as daily. In such an embodiment, the selected groupings or pairs will be employed for taxiing for the entirety of the day and for all flight legs during that day.

According to yet another embodiment of the invention, the activated groupings or pairs of brakes can be switched at any time that the then-activated brakes reach a predetermined temperature level. By way of example, that temperature level could be a temperature beyond which a rejected takeoff (RTO) could not be accommodated. Other suitable levels can be envisioned.

The invention contemplates that data regarding the enablement and utilization of various groupings or pairs of brakes will be stored in non-volatile memory (NVM) such that the data does not risk being lost when the aircraft is shut down for any period of time or power is otherwise lost or disconnected.

Figure 2:
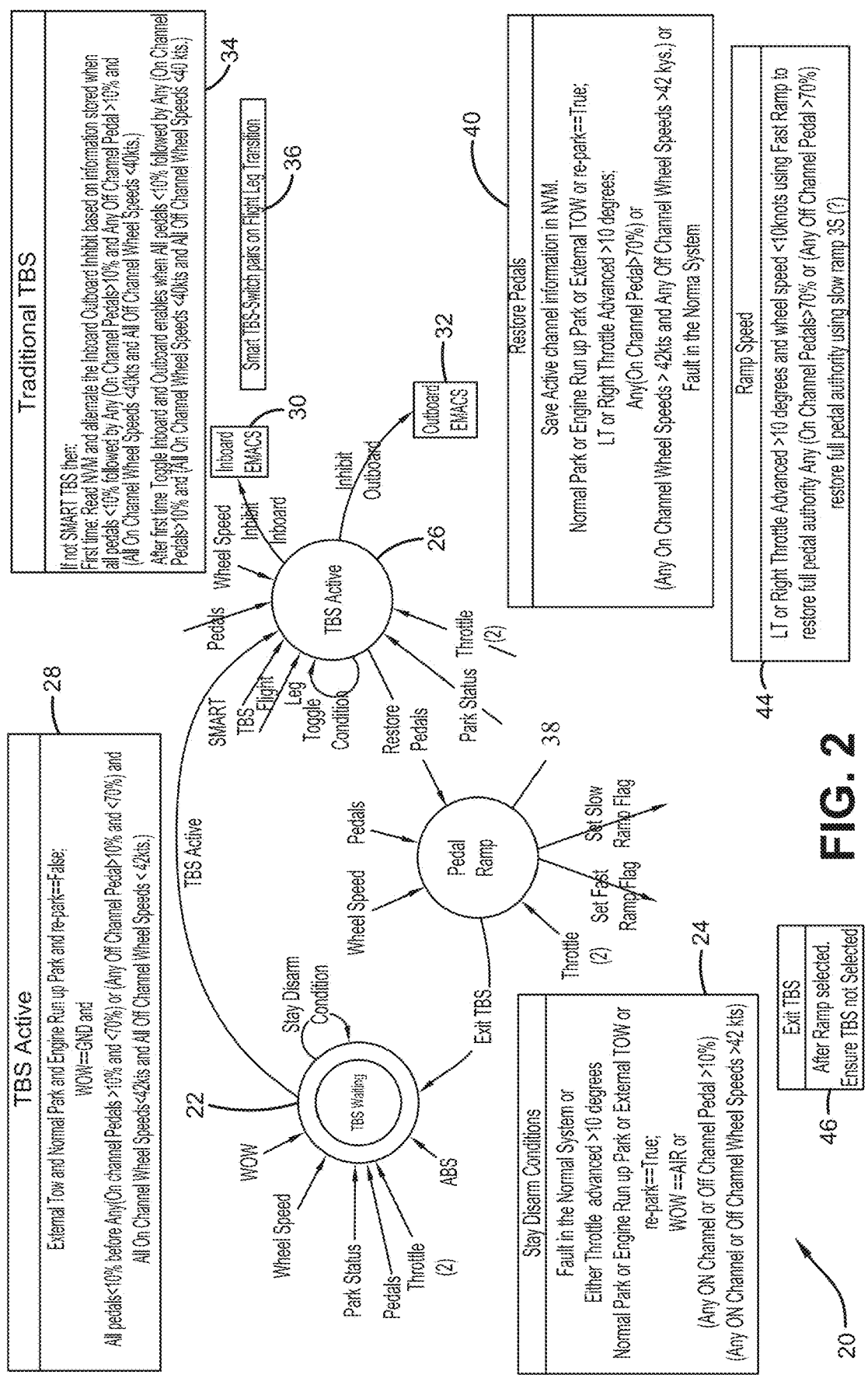
FIG. 2 is a functional diagram adapted for various embodiments of the invention.

With reference now to FIG. 2, an appreciation can be obtained with regard to the general structure and operation of the invention. As presented in the drawings and specification hereafter, the invention is generally that of a taxi brake select (TBS) nature and, more particularly, a Smart TBS system, designated generally by the numeral 20 in FIG. 2.

The TBS system stays in waiting and disarmed or inactivated as at 22, while monitoring various inputs as identified at 24. The TBS system monitors a weight on wheels (WOW) switch to determine whether the aircraft is in the air or has landed. It further monitors wheel speed as provided by various wheel speed transducers. It further monitors the status of the aircraft as to whether it is parked or actually available for movement. Pedal deflection or depression by the pilot or co-pilot is also monitored, as is the position of the throttle. The system further monitors whether an automatic braking system (ABS) is employed and whether it is requesting TBS activity.

As shown at 24, the TBS system stays in waiting, or is disarmed, in the event there is a fault sensed in the normal system or if the throttle is advanced greater than a certain amount, such as greater than 10°. A determination is further made whether the aircraft is in a normal parked condition, an engine-run-up parked position, whether it is under external towing, or whether it has engaged re-park (where the brake disc stack has been re-engaged to reset the brakes when the aircraft is parked and the brake discs have had an opportunity to cool down, with the associated disc shrinkage requiring a reapplication of brake pressure).

If the WOW sensor establishes that the aircraft is still in the air and has not landed, or that any of the brake pedals have been depressed more than 10%, or the aircraft speed on the ground is greater than 42 knots, the TBS system remains disarmed and/or in waiting until all conditions have been met for enablement of the system and rendering the system active as at 26, with those conditions shown in the block 28.

As shown at 28, if there is neither external tow, normal park, engine run-up park, nor re-park present, and if the WOW sensor indicates that the aircraft is on the ground, if it is further determined that all of the pedals are less than a certain amount of deflection (less than 10%), and the wheel speed is less than 42 knots, all by way of example, the TBS system may be activated or overruled by the pilot/co-pilot. While in TBS active at 26, numerous data is monitored to control the actuation and release of the aircraft brakes during taxiing. The actual brakes to be employed are determined by data from the flight log as to whether the brake pairs are selected by flight, daily, or as function of temperature, as presented above. Further signals are received from the Smart TBS system, such as will be discussed hereinafter. Brake pedal data is received and considered, as is wheel speed data, park status data, electronic brake wear data (if available), BTMS brake temperatures, and throttle position data.

When the TBS is active, as at 26, it will selectively inhibit different sets of brakes, such as the inboard or outboard sets, depending upon the strut configuration, allowing the brakes that are not inhibited to control the braking function during taxiing. In the event of an electric brake system, the inhibiting may be of the associated electric motor actuator controllers (EMACs), such as the inboard EMACs at 30, or the outboard EMACs at 32.

At 34, traditional TBS operation is shown. Traditionally, the toggling or selection for enabling or inhibiting between the inboard and outboard EMACs 30, 32 simply occurs by reading from a non-volatile memory the last status of EMAC activation when brake pedal depression is beneath a predetermined level, such as 10%, and wheel speeds are less than a predetermined level, such as 40 knots, at which time the enabling and disabling of EMACs is toggled from the reading from the non-volatile memory.

The Smart TBS toggling or switching between the inboard and outboard EMACs generally follows a process as at 36. Again, with pedals depressed less than a predetermined threshold, such as 10%, and wheel speed below a level such as 40 knots, the prior state of activation and inhibiting of the EMACs 30, 32 is determined from the flight log, and then toggling is engaged consistent with one of the three embodiments discussed above. That toggling may occur according to one embodiment on each flight leg, or another embodiment at the beginning of each day, or according to yet a third embodiment when a brake stack exceeds or falls below a preset temperature threshold. In each event, the flight log is incremented to effect and confirm the appropriate toggling on the occurrence of the next similar event.

With continued reference to FIG. 2, it can be seen that taxi brake select activity may be terminated and brake activity restored to its normal operation without taxi brake select, and that such activity involves restoring the brake pedal to control the activity of both the inboard and outboard EMACs 30, 32. Restoring of the pedal is effected by a pedal ramp 38 with the process generalized in the restore-pedals-step 40.

To begin, the data relevant to the implementation of taxi brake select that is being departed is stored in non-volatile memory such that the next involvement of taxi brake select will have that data available for inhibiting the necessary EMACs. A determination is then made as to the state of the aircraft, including whether the aircraft is in normal park, engine run-up park, external tow, re-park, a throttle advance exceeding a threshold such as 10°, a brake pedal depression exceeding 70%, a wheel speed exceeding a set threshold such as 42 knots, a fault in the normal operating system, or a BTMS brake temperature output greater than a predetermined threshold, then the brake pedals will be restored, as at 40, by means of a pedal ramp at 38.

The pedal ramp speed is set according to the criteria of 44. A pedal ramp is necessary when departing TBS operations for a number of reasons. If there is greater than 70% of brake pedal travel, then turning TBS off and engaging the full complement of brakes through EMACs 30, 32 could cause significant grabbing of the brakes and discomfort to passengers. Accordingly, a slow ramp might be desired. If, however, wheel speed were below a threshold, such as 10 knots or the like, or if the throttle were to be suddenly advanced, a fast ramp of pedal recovery for a couple of seconds might be desired, such as when the aircraft is making its final taxi turns onto the runway before takeoff. See such criteria at 44, effecting either a slow ramp or a fast ramp at 38.

At the block 46, TBS is exited after an appropriate ramp has been selected, ensuring that TBS is not engaged.

Figure 3:
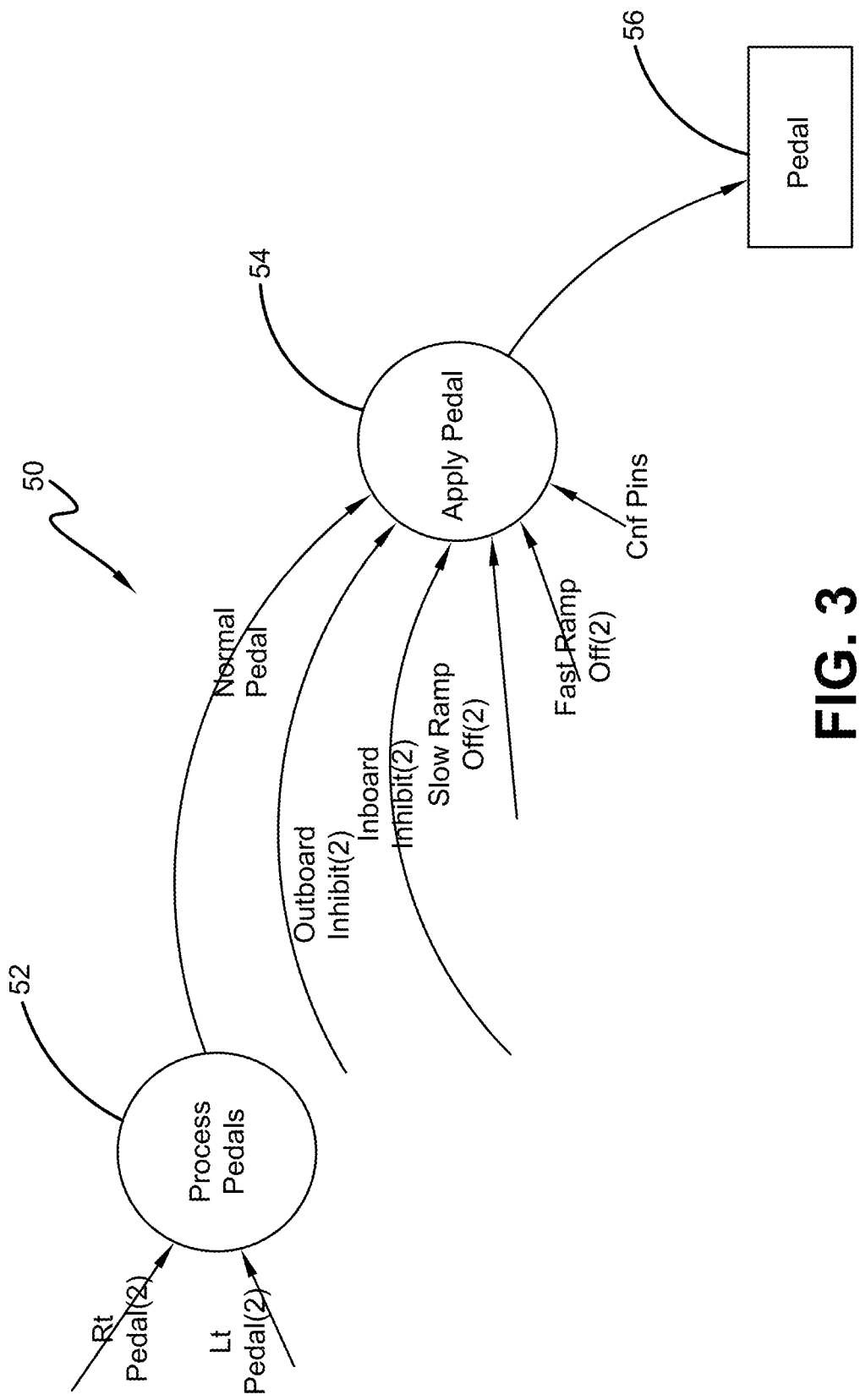
FIG. 3 is a flow diagram for restoring normal pedal operation upon departing the use of the taxi brake select system of the invention.

In some brake control architectures, pedals are returned to their appropriate position with full braking capability and with all EMACs engaged by the process of FIG. 3, designated by the numeral 50. The pedals are processed at 52 as to their measure of depression and return to normal operation. The outboard inhibit and inboard inhibit are removed, and the slow ramp and fast ramp controls are turned off. Control CnfPins may also be provided to the applied pedal function 54 to fully restore the pedals as at 56. These pins are provided in electronic brake systems with multiple controllers to identify which motors on a particular wheel are being controlled. This helps to identify if the EMAC is controlling an inboard or outboard wheel. Of course, the specific details are left to the particular braking architecture of the aircraft.

A thermal model is contemplated to predict brake temperature and BTMS temperature, according to one embodiment of the invention. This is done by integrating the sum of input heat flows Q to each temperature node divided by the mass m and specific heat c of the associated nodes of the heat disc stack.

The thermal model accounts for all heat transfer modes, including conduction, convection, and radiation, along with internal energy generation. Inputs of ambient temperature, cooling air speed, and wear state may be provided for these calculations. Standard heat transfer equations for conduction, convection, and radiation, as are well known to those skilled in the art, are used.

Internal energy generation is used to account for the energy input due to braking events. The inputs of wheel velocity and aircraft mass per wheel are used to compute this energy in this embodiment.

Additionally, a correction factor is multiplied by the difference between the measured and calculated BTMS temperatures as a feedback mechanism to adjust the model predictions based on the available BTMS temperature measurement. This correction factor can be adjusted based on parameters such as node temperatures and the rate of change of these temperatures. It can be made zero to avoid correction, if desired. The final value of this correction is added to the braking energy as an additional energy generation component to arrive at the total internal energy generation. As a result, the predicted brake temperature can be corrected using the measured BTMS temperature by including it in the feedback loop with the predicted BTMS temperature, even though no direct brake temperature feedback is available. This process employs a BTMS having a measured (monitored) temperature output and a calculated temperature output.

Thus it can be seen that the various aspects of the invention have been achieved by the system presented and described above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. A method for optimizing aircraft carbon disc brake wear during taxiing, comprising:
    calculating, from the parameters of braking torque, wheel speed, brake pedal depression, aircraft mass per wheel, ambient temperature and state of brake wear, actual energy absorbed by each carbon disc brake during taxiing operations;
    from the calculations of the actual energy absorbed, determining a current carbon disc brake temperature; and
    selectively inhibiting and enabling actuation of said carbon disc brakes as a function of said disc brake temperature.

2. The method for optimizing aircraft carbon disc brake wear as recited in claim 1, wherein the step of selectively inhibiting and enabling controls both sequence of inhibiting and enabling and duration of inhibiting and enabling.

3. The method for optimizing aircraft carbon disc brake wear as recited in claim 2, wherein the sequence and duration of inhibiting and enabling maintains the carbon disc brakes in a preferred operational temperature to optimize wear.

4. The method for optimizing aircraft carbon disc brake wear as recited in claim 2, wherein said carbon disc brakes are inhibited and enabled for activation in groups of brakes.

5. The method for optimizing aircraft carbon disc brake wear as recited in claim 4, wherein the groups of brakes selected for being inhibited and enabled are based on parameters taken from the group of flight logs, time periods and brake temperature.

6. The method for optimizing aircraft carbon disc brake wear as recited in claim 5, wherein data pertaining to activities of said groups of brakes is stored in non-volatile memory.

7. The method for optimizing aircraft carbon disc brake wear as recited in claim 5, further comprising an instant overriding control function for pilot use for selection of the groups of brakes activated and inhibited.

8. The method for optimizing aircraft carbon disc brake wear as recited in claim 4, further comprising monitoring a state of a weight-on-wheels switch, wheel speed, brake pedal depression, and throttle position.

9. The method for optimizing aircraft carbon disc brake wear as recited in claim 8, wherein the method is inhibited when the weight-on-wheels switch determines the aircraft has not landed, when any brake pedal is depressed more than a first threshold, or ground speed exceeds a second threshold.

10. The method for optimizing aircraft carbon disc brake wear as recited in claim 4, further comprising returning brake operation involving all groups of brakes to pilot control by restoring brake pedals to pilot control by means of a pedal ramp.

11. The method for optimizing aircraft carbon disc brake wear as recited in claim 10, wherein said pedal ramp is slow when brake pedal travel is high and engagement of all brakes would cause significant grabbing of the brakes.

12. The method for optimizing aircraft carbon disc brake wear as recited in claim 11, wherein said pedal ramp is fast when wheel speed is below a third threshold, the fast pedal ramp accommodating sudden throttle advances.

* * * * *